US009550921B2

(12) United States Patent
Clarke et al.

(10) Patent No.: US 9,550,921 B2
(45) Date of Patent: Jan. 24, 2017

(54) MASKING TAPE WITH MULTI-DIRECTIONAL HAND TEAR

(75) Inventors: Graham M. Clarke, Woodbury, MN (US); Joseph T. Bartusiak, Osseo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1018 days.

(21) Appl. No.: 13/584,451

(22) Filed: Aug. 13, 2012

(65) Prior Publication Data

US 2014/0044912 A1    Feb. 13, 2014

(51) Int. Cl.
*B32B 7/12*    (2006.01)
*C09J 7/02*    (2006.01)

(52) U.S. Cl.
CPC ......... *C09J 7/0264* (2013.01); *C09J 2201/122* (2013.01); *C09J 2201/20* (2013.01); *C09J 2201/606* (2013.01); *C09J 2203/31* (2013.01); *Y10T 428/15* (2015.01)

(58) Field of Classification Search
None
See application file for complete search history.

(56) References Cited

U.S. PATENT DOCUMENTS

| | | | | |
|---|---|---|---|---|
| 4,139,669 A | * | 2/1979 | Chang | C09J 7/0264 428/167 |
| 4,298,647 A | * | 11/1981 | Cancio | B44C 1/10 428/167 |
| 4,465,729 A | * | 8/1984 | Cancio | B44C 1/10 156/209 |
| 6,383,958 B1 | | 5/2002 | Swanson | |
| 6,541,109 B1 | * | 4/2003 | Kumar | C09J 7/0228 106/287.11 |
| 6,635,334 B1 | * | 10/2003 | Jackson | B32B 3/10 428/132 |
| 6,641,805 B1 | * | 11/2003 | Morita | A61K 8/8152 424/401 |
| 8,530,021 B2 | * | 9/2013 | Bartusiak | B32B 38/06 428/167 |
| 2004/0001931 A1 | | 1/2004 | Izzi | |
| 2008/0280088 A1 | * | 11/2008 | Baum | A47K 10/16 428/43 |
| 2011/0053476 A1 | | 3/2011 | Beyer | |
| 2013/0025779 A1 | | 1/2013 | Bartusiak | |

FOREIGN PATENT DOCUMENTS

| | | |
|---|---|---|
| EP | 0 373 646 | 3/1995 |
| EP | 1 516 898 | 3/2005 |
| JP | 06285978 A * | 10/1994 |
| JP | 2002317161 A * | 10/2002 |
| WO | WO 01-44398 A1 | 6/2001 |
| WO | WO 2012-091742 A1 | 7/2012 |
| WO | WO 2012-121869 A2 | 9/2012 |

OTHER PUBLICATIONS

Kiyotsugu, Akima, "Method of producing adhesive tape", English translation of JP3514790, Mar. 31, 2004.*
Kotaro, Funahiki, "Hand tearable synthetic resin film and hand tearable adhesive tape", English translation of JP 06285978, Oct. 11, 1994.*
Definition "molded" from the Free Dictionary, retrived May 31, 2016.*
International Search Report, PCT/US2013/053328, mailed Oct. 17, 2013, 3 pages.

* cited by examiner

*Primary Examiner* — Anish Desai
(74) *Attorney, Agent, or Firm* — Kenneth B. Wood

(57) ABSTRACT

A hand-tearable masking tape with a primary microstructured hand-tear pattern and at least one secondary hand-tear pattern oriented so that the tape exhibits multi-directional tear.

15 Claims, 6 Drawing Sheets

US 9,550,921 B2

MASKING TAPE WITH MULTI-DIRECTIONAL HAND TEAR

BACKGROUND

Masking tapes have been used for some time in the painting of surfaces. Masking tapes are often comprised of creped paper with a pressure-sensitive adhesive on one surface.

SUMMARY

Disclosed herein is a hand-tearable masking tape with a primary microstructured hand-tear pattern and at least one secondary hand-tear pattern. These and other aspects of the invention will be apparent from the detailed description below. In no event, however, should the above summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", "bottom", "upper", "lower", "under", "over", "front", "back", "up" and "down", and "first" and "second" may be used in this disclosure, it should be understood that those terms are used in their relative sense only unless otherwise noted. The terms outward and inward refer to directions generally away from the interior of backing 2 of tape 1, and toward the interior of backing 2 of tape 1, respectively. As used herein as a modifier to a property or attribute, the term generally, unless otherwise specifically defined, means that the property or attribute would be readily recognizable by a person of ordinary skill but without requiring absolute precision or a perfect match (e.g., within +/−20% for quantifiable properties). The term substantially, unless otherwise specifically defined, means to a high degree of approximation (e.g., within +/−10% for quantifiable properties) but again without requiring absolute precision or a perfect match. Terms such as same, equal, uniform, constant, strictly, and the like, as applied to a quantifiable property or attribute, mean within +/−5%, unless otherwise specifically defined.

DETAILED DESCRIPTION

Figure 1:
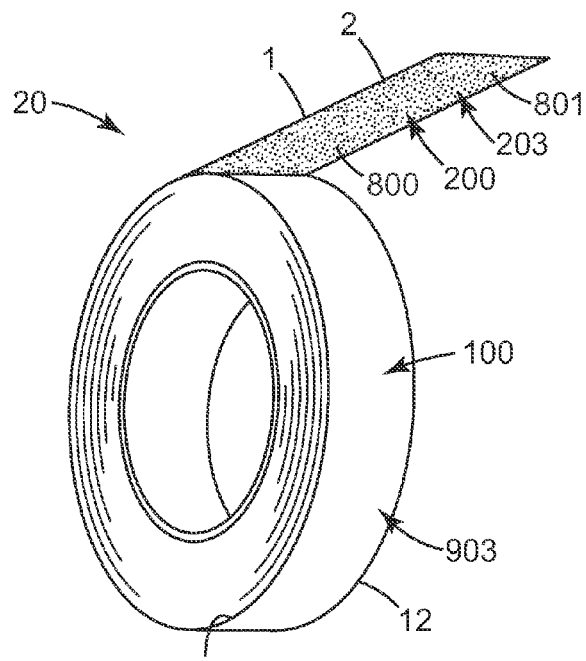
FIG. 1 is a perspective view of a length of exemplary microstructured tape, in the form of a roll.
Figure 2:
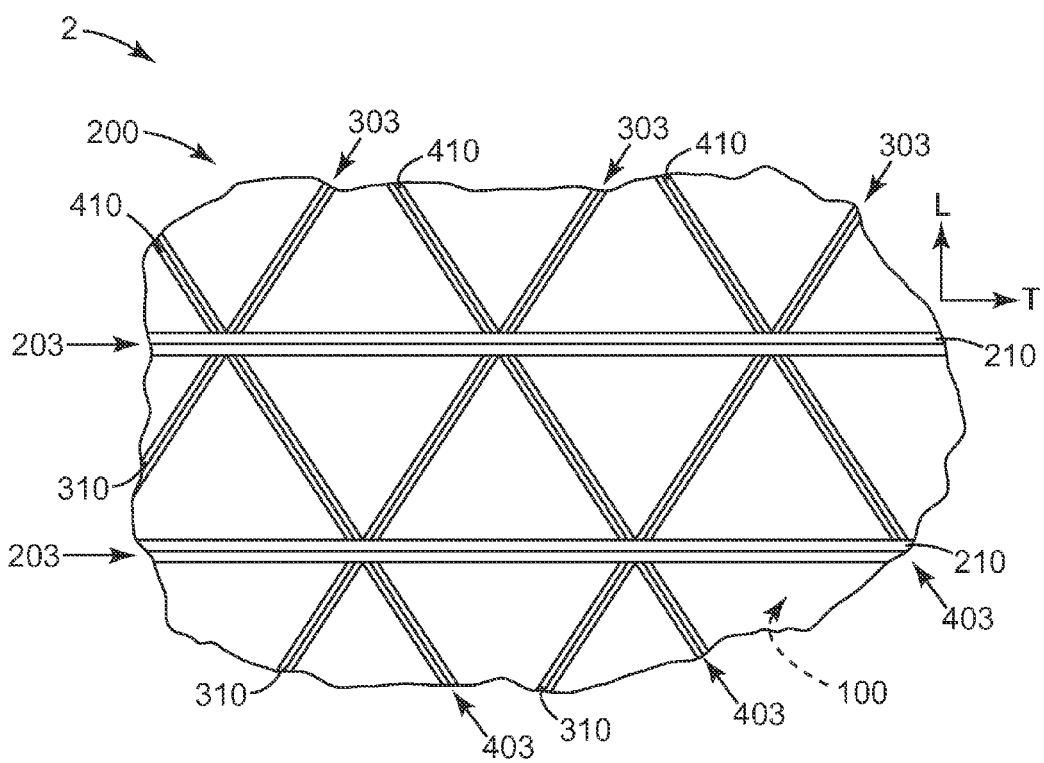
FIG. 2 is a plan view of a portion of a major side of a tape backing comprising exemplary microstructured hand-tear patterns.

Shown in FIG. 1 is a perspective view of microstructured tape 1 in the form of a roll 20 comprised of a backing 2 with a pressure-sensitive adhesive 800 on a major side thereof. FIG. 2 shows a plan view of first major side 200 of backing 2. (In this and all other figures in which they appear, the term "T" designates the transverse axis, and the term "L" designates the longitudinal axis, of tape 1 and backing 2 thereof.) Tape 1 and backing 2 thereof comprise a longitudinal axis and length, a transverse axis and width and minor transverse edges 11 and 12 (i.e., e.g., as seen in FIG. 2), a thickness, and first and second major sides 200 and 100. As shown in FIG. 1, microstructured tape 1 may be conveniently provided in an elongate length in the form of a roll, e.g. a self-wound roll without a release liner, from which a length of tape 1 may be removed by hand-tearing (although other methods involving scissors or other cutting implements may be used if desired). Outward-facing major adhesive surface 801 of pressure-sensitive adhesive may then be used to adhere the length of tape 1 to a surface portion that is desired to be masked. An adjacent surface portion may then be painted without paint unacceptably penetrating onto the masked surface portion.

As shown in exemplary manner in FIG. 2, first major side 200 of backing 2 comprises at least a primary microstructured hand-tear pattern 203. By a primary microstructured hand-tear pattern is meant a multiplicity of primary lines of weakness 210 (as shown in exemplary manner in FIG. 2) that are present on first major side 200 of backing 2, that comprise a long axis that is oriented within plus or minus about 10 degrees of the transverse axis of backing 2, that extend at least generally across the width of backing 2, and that are spaced along the longitudinal extent of backing 2. Primary lines of weakness 210 may enhance the ability of backing 2 of tape 1 to be hand-torn at least generally transversely across its width so as to remove a length of backing 2 and tape 1 from a longer length (e.g., from a roll). In further embodiments, primary lines of weakness 210 (i.e., a long axis thereof) may be oriented within plus or minus about 5 degrees, or plus or minus about 2 degrees, of the transverse axis of backing 2 (e.g., as depicted in exemplary manner in FIG. 2).

Backing 2 comprises at least one secondary microstructured hand-tear pattern, e.g. first secondary hand-tear pattern 303 as shown in exemplary manner in FIG. 2. By secondary microstructured hand-tear pattern is meant a multiplicity of secondary lines of weakness 310 that may be present on either first major side 200 of backing 2 (as in the exemplary embodiment of FIG. 2) or second major side 100 of backing 2, and that comprise a long axis that is oriented at an (included) angle of about 25-90 degrees relative to the long axis of primary lines of weakness 210 of primary microstructured hand-tear pattern 203. In some embodiments secondary lines of weakness 310 may be spaced along the longitudinal extent of backing 2 and may comprise long axes that extend at least generally across the width of backing 2.

In some embodiments, secondary hand-tear pattern 303 may be the only secondary hand-tear pattern that is provided on backing 2. In other embodiments, secondary hand-tear pattern 303 may be a first secondary hand-tear pattern, with backing 2 comprising at least one additional secondary microstructured hand tear pattern, e.g. second secondary hand-tear pattern 403 as shown in exemplary manner in FIG. 2. By a second secondary microstructured hand-tear pattern is meant a multiplicity of second secondary lines of weakness 410 that may be present on either first major side 200 of backing 2 (as in the exemplary embodiment of FIG. 2) or second major side 100 of backing 2, and that comprise a long axis that is oriented at an included angle of about 25-65 degrees relative to the long axis of the primary lines of weakness of primary microstructured hand-tear pattern 203, that is oriented at an (included) angle of about 90-50 degrees with respect to the long axis of the first secondary lines of weakness of first secondary microstructured hand-tear pattern 303. In some embodiments second secondary lines of weakness 410 may extend at least generally across the width of backing 2 and may be spaced along the longitudinal extent of backing 2.

Primary lines of weakness 210 as described herein may enhance or promote the ability of backing 2 to be torn by hand in such a way that the propagating tear is steered in a desired direction, e.g. within plus or minus 10 degrees of the transverse axis of backing 2 and tape 1. Secondary lines of weakness 310 (and 410 if present), may provide the further ability to alternatively tear backing 2 along a desired path that is different from that of primary lines of weakness 3210, e.g. at an included angle of approximately 45 degrees relative thereto as shown in exemplary embodiment in FIG. 11 and discussed later in detail. Thus, a user of tape 1 may be able to choose between tearing tape 1 e.g. straight across the transverse width of the tape, or e.g. diagonally across the transverse width of the tape. Thus, a length of tape 1 can be advantageously provided with a terminal end that is angled (i.e., that does not extend strictly, or even generally, in alignment with the transverse axis of backing 2), without the use of special tools. For example, two such angled terminal ends of two elongate lengths of tape 1 might be placed into a corner so that the angled terminal edges of the ends are abutted against each other, so as to provide effective masking of a corner surface area without having to overlap any portions of the lengths of tape.

In the exemplary embodiment shown in FIG. 2, lines of weakness 210, 310 and 410 are all provided by continuous, linear grooves. (For all such lines of grooves shown in the Figures, the centerline depicts the deepest (inwardmost) surface of the groove.) Many other variations are possible, as discussed later herein. In the exemplary embodiment of FIG. 2, primary lines of weakness 210 and secondary lines of weakness 310 and 410 are all on first major side 200 of backing 2. However, in other embodiments at least one set of secondary lines of weakness may be provided on second, oppositely facing major side 100 of backing 2 (as exemplified by secondary lines of weakness 310 depicted in hidden lines in FIG. 3). In still other embodiments first and second secondary lines of weakness may both be provided on second major side 100 of backing 2 (as exemplified by secondary lines of weakness 310 and 410 depicted in hidden lines in FIG. 4).

Specific embodiments of lines of weakness will now be described with respect to exemplary lines of weakness 110 as pictured variously in FIGS. 5-9. It will be appreciated that the lines of weakness 110 shown in FIGS. 5-9 are generic representations, with only one set of lines of weakness shown therein for ease of presentation, and that the designs and features shown therein may be applied to any or all of above-described primary lines of weakness and first and/or second secondary lines of weakness. Therefore, it will be recognized that lines of weakness 110 of FIGS. 5-9 may represent any of first or secondary lines of weakness 210, 310, and/or 410.

Figure 5:
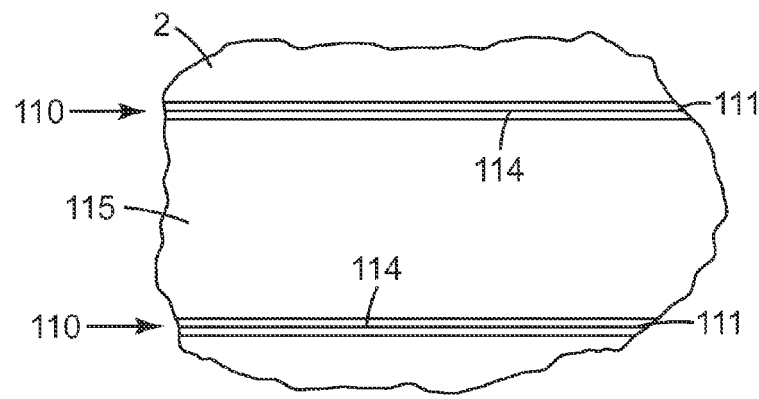
FIG. 5 is a plan view of a portion of a major side of another tape backing comprising an exemplary microstructured hand-tear pattern.
Figure 6:
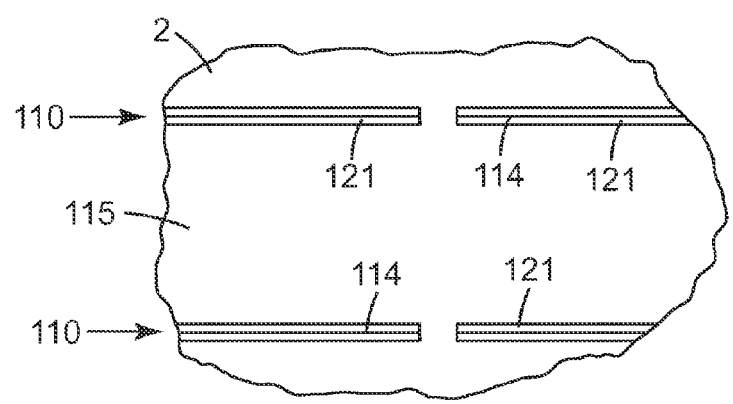
FIG. 6 is a plan view of a portion of a major side of another tape backing comprising an exemplary microstructured hand-tear pattern.
Figure 7:
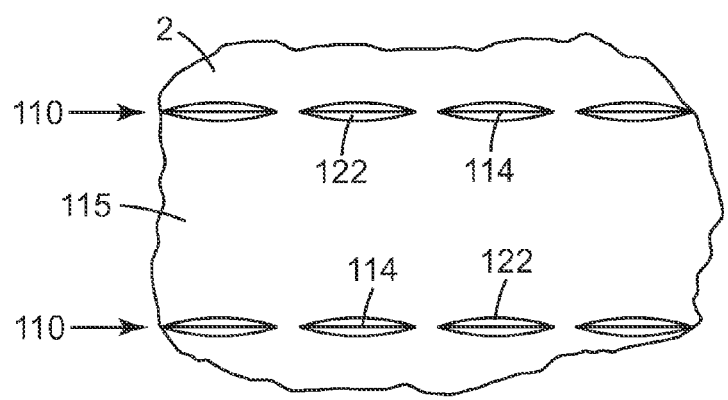
FIG. 7 is a plan view of a portion of a major side of another tape backing comprising an exemplary microstructured hand-tear pattern.
Figure 8:
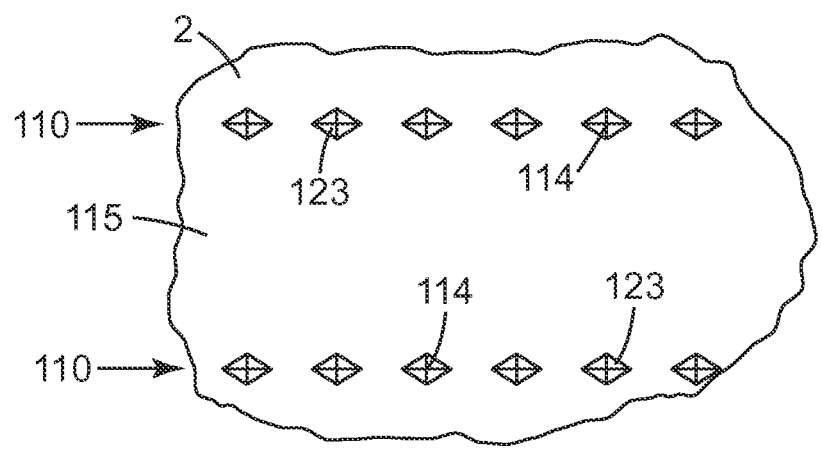
FIG. 8 is a plan view of a portion of a major side of another tape backing comprising an exemplary microstructured hand-tear pattern.
Figure 9:
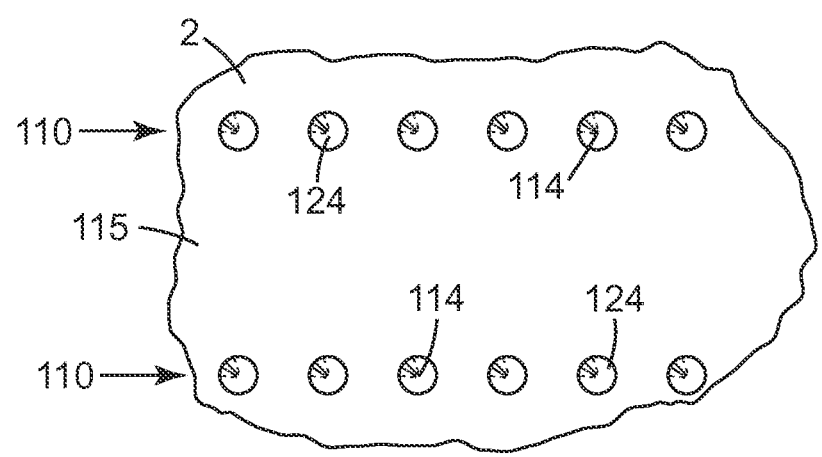
FIG. 9 is a plan view of a portion of a major side of another tape backing comprising an exemplary microstructured hand-tear pattern.

With reference to FIGS. 5-9, an individual line of weakness 110 may be a continuous line of weakness that is provided by a continuous recess (e.g., a continuous groove), or may be a discontinuous line of weakness that is provided collectively by a multiplicity of recesses that are arranged along a desired tear path. By a recess is meant a feature at least some of whose surface(s) are recessed below (i.e., inward toward the interior of backing 2) a major surface 115 (which may be, but is not necessarily, a generally flat plano surface) of a major side of backing 2, so as to comprise an open-ended, outward-facing cavity (e.g., a depression, divot, notch, trench, groove, furrow, hole, etc.). Recesses as defined herein do not encompass interior cavities, voids, pores or the like as might be present in some materials (e.g., microporous materials, foams and the like), nor do they encompass such pores as might be present on the surface of open-celled foams and the like. By microstructured hand-tear pattern is further meant that the recesses that provide lines of weakness 110 comprise predetermined, molded structures (e.g., as obtained by molding a polymeric thermoplastic resin against a tooling surface that comprises the negative of the recesses desired to be provided on the major side of backing 2) with dimensions ranging from about 5 to about 200 microns in at least two orthogonal directions. One of these orthogonal directions is normal to the plane of backing 2 thus this dimension comprises the recess depth. By way of example, for a line of weakness 110 that is provided by a recess comprised of an elongate groove 111 as shown in FIG. 5, the recess depth is the distance that the deepest (inwardmost) point 114 of groove 111 is spaced inward from major surface 115 of backing 2, along an axis normal to the major plane of backing 2. Often, the lateral width of groove 111 (lateral meaning in a direction across the width of the groove) may comprise the second, orthogonal direction. Thus, if the depth of groove 111 and the lateral width of groove 111 are both in between about 5 and about 200 microns at any location along the length of groove 111, groove 111 is by definition a microstructured feature irrespective of the fact that it may have an extremely long length. It will be appreciated that molded microstructures (e.g. recesses) as disclosed herein are distinguished from features that are achieved by post-processing (e.g., by coating, depositing, ablation, perforation, punching, drilling, laser-ablation, flame-perforation, and the like). It will also be appreciated that recesses that function to provide lines of weakness as disclosed herein are dead-end cavities that are distinguished from through-holes that extend all the way through backing 2 (notwithstanding that in some embodiments backing 2 may comprise through-holes that are provided for some other purpose).

In some embodiments, a recess that provides a continuous line of weakness 110 may comprise a continuous elongate groove 111 that extends continuously from one minor edge 11 of backing 2 to other minor edge 12 of backing 2. Such a design is shown in representative illustration in FIG. 5; it will also be appreciated that the grooves of lines of weakness 210, 310 and 410 as shown in FIG. 2, are also of this general type.

In some embodiments, lines of weakness 110 may be discontinuous, that is, provided not by a single recess but rather by a multiplicity of (e.g., two or more) recesses, spaced along a long axis (optionally, but not necessarily, in a strictly straight line) along a desired tear path and acting in combination to promote and facilitate tearing along that path. In a specific example exemplified in FIG. 6, discontinuous grooves 121 may be provided that are interrupted by gaps (e.g., bearing plano surface 115) and that thus do not extend continuously across the entire transverse width of backing 2. In a modification of this approach shown in FIG. 7, a discontinuous line of weakness 110 is provided collectively by a multiplicity of elongate oval recesses 122 that are aligned generally linearly along a desired tear path, each oval recess comprising a long axis that is generally oriented along the desired tear path. In a slight modification of this approach shown in FIG. 8, recesses 123 comprise diamond-shaped recesses aligned generally linearly along a desired tear path, each diamond-shaped recess comprising a long axis that is generally oriented along the desired tear path. It should be noted that such approaches do not necessarily require that individual recesses comprise a long axis that is generally oriented along the desired tear path. Thus, in the exemplary embodiment of FIG. 9, lines of weakness 110 are collectively provided by rows of generally circular recesses 124. (In FIGS. 5-9, the deepest-inward point of a recess is designated by the reference number 114).

In any of the above embodiments comprising a continuous line of weakness provided by a single continuous recess, or a discontinuous line of weakness provided by a multiplicity of recesses acting in combination, the depth of a recess may be at least about 10 microns, at least about 15 microns, or at least about 20 microns. In further embodiments, the recess depth may be at most about 60 microns, at most about 50 microns, or at most about 40 microns. If a recess has a long axis, the width of the recess may be constant along the length of the recess (as in FIG. 6), or it may vary along the length (as in FIGS. 7 and 8). In various embodiments, the width of a recess (which may be measured at any suitable location of the recess, and may be the diameter in the case of a generally circular recess) may be at least about 20 microns, at least about 40 microns, or at least about 60 microns. In further embodiments, the width of a recess may be at most about 140 microns, at most about 120 microns, or at most about 100 microns. In various embodiments, the edge-to-edge spacing between nearest edges of adjacent recesses of a discontinuous line of weakness may be at least about 10 microns, at least about 20 microns, or at least about 30 microns. In further embodiments, the edge-to-edge spacing between recesses may be at most about 200 microns, at most about 100 microns, or at most about 60 microns.

In any of the aforementioned continuous or discontinuous lines of weakness provided by one or more recesses, the depth of an individual recess may vary; and/or different recesses may comprise different depths (whether variable or constant). Recesses may be of different widths or of the same width. A recess width may vary along its inward-outward depth relative to the plane of backing 2, e.g. so that it is tapered e.g. with a V-shaped cross-section or with any other suitable shape when viewed in cross section. That is, a recess may comprise a constant width along its depth, may comprise a flat bottom, an arcuate bottom, etc., and/or flat walls, sloped walls, arcuate walls etc. The recess may or may not be symmetric when viewed in cross section. All that is required is that the recesses be designed and arranged with appropriate geometry (e.g., depths, widths, spacings, etc.) so as to, individually or collectively, provide a line of weakness that imparts the herein-described ability to hand-tear backing 2 along a desired tear path.

Whether lines of weakness are continuous or discontinuous (with mixtures of both being encompassed within the disclosures herein), the spacing between individual lines of weakness 110 may be constant down the length of backing 2, or may vary. Lines of weakness 110 may be interspersed (e.g., in the longitudinal direction down backing 2) by generally flat portions of surface 115 or by outwardly-protruding structures, and/or by any other features. All of the lines of weakness of a particular hand-tear pattern do not have to be oriented at exactly the same angle (e.g., relative to the transverse axis of backing 2). Furthermore, it should be noted that the concept of a multiplicity of lines of weakness as disclosed herein does not imply that the recess or recesses that individually or collectively provide a particular line of weakness 110 must necessarily be aligned in a purely straight-line arrangement. Rather, for example, a continuous line of weakness 110 may be provided by a continuous groove that is somewhat arcuate, wavy, sinusoidal, sawtooth, or the like, as long as its overall path is across backing 2 in the manner disclosed herein. Similarly, a multiplicity of recesses arranged along a somewhat arcuate, wavy, sinusoidal, sawtoothed etc. path may likewise provide a discontinuous line of weakness 110. In some embodiments, of course, a purely linear path may be desired.

It will be appreciated that lines of weakness 110 may enhance the ability of a hand-tear to be initiated, in addition to enhancing the ability of a propagating hand-tear to be steered in a desired direction. As such, in some embodiments it may be advantageous for a recess that comprises at least a portion of a line of weakness to be present at minor edge 11 of backing 2, and likewise for a recess to be present at minor edge 12 of backing 2. This may be provided, for example, by a line of weakness that is a continuous groove (such as, e.g., exemplary groove 111 of FIG. 5) that extends to minor edges 11 and 12 of backing 2. Or, in the case of a discontinuous line of weakness, the multiplicity of recesses that make up the line of weakness may be arranged such that a recess is present at minor edge 11 of backing 2, and that a recess is likewise present at minor edge 12 of backing 2. In either case, a line of weakness is provided that extends across the entire transverse width of a major side of backing 2, from one minor edge 11 to other minor edge 12. In a variation of such approaches, recesses that comprise portions of primary lines of weakness 210 may be present at a first minor edge (e.g., 11) of backing 2, but not at second minor edge 12. Similarly, recesses that comprise portions of secondary lines of weakness (e.g., 310 and/or 410) may be present at second, opposite minor edge 12 of backing 2, but not at first minor edge 11. Such arrangements may make it advantageous to tear backing 2 from first edge 11 if it is desired to preferentially tear backing 2 along a primary line of weakness, and to tear backing 2 from second edge 12 if it is desired to preferentially tear backing 2 along a secondary line of weakness.

Figure 10:
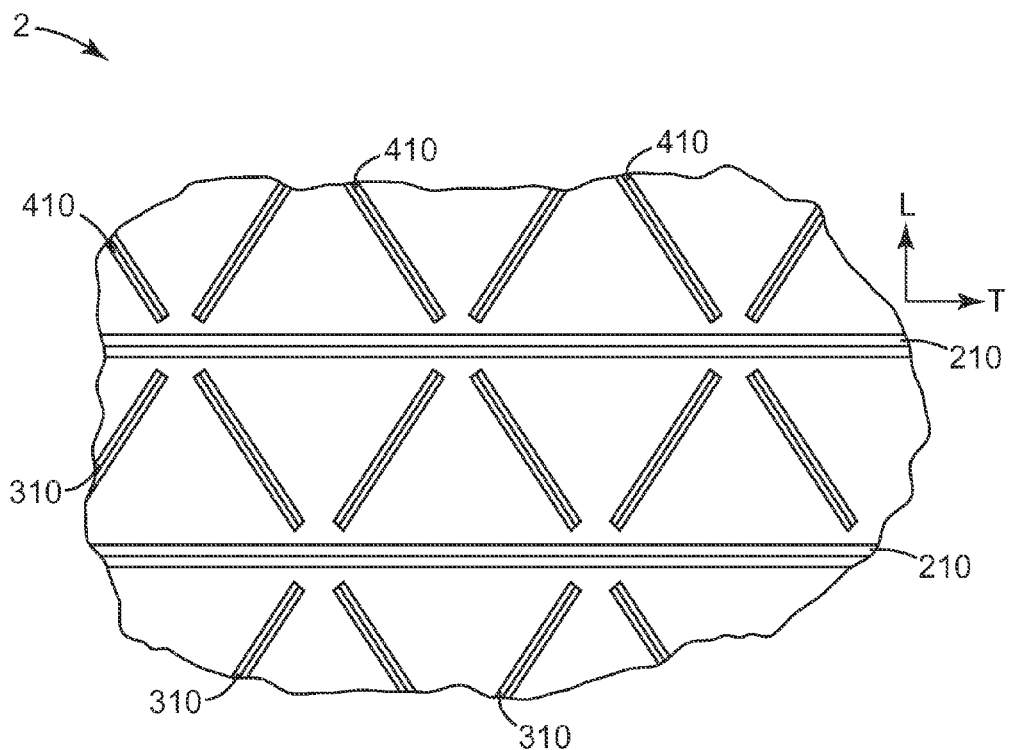
FIG. 10 is a plan view of a portion of a major side of another tape backing comprising exemplary microstructured hand-tear patterns.

It will be appreciated that in some embodiments the design of lines of weakness 210 of primary hand-tear pattern 203 can differ from that of lines of weakness 310 (and 410, if present) of a secondary hand-tear pattern 303 (and 403, if present). This may be true whether or not the secondary hand-tear pattern(s) is on the same side of backing 2 as the primary hand-tear pattern, or is on the opposite side. This may be useful, for example, in order to enhance the ability for a user to tear backing 2 and tape 1 along the primary hand-tear pattern, since this may be the direction in which the tape is most commonly torn (relative to the ability to tear the tape along a secondary hand-tear pattern). Thus, for example, lines of weakness 210 of primary hand-tear pattern may be designed so as to more easily initiate and/or propagate a tear, in comparison to lines of weakness 310 and or 410. For example, lines of weakness 210 may be continuous grooves, while lines of weakness 310 and/or 410 might be discontinuous recesses. In a particular design of this type, lines of weakness 310 and/or 410 may comprise interruptions (i.e., discontinuities) at the point at which they intersect lines of weakness 210. An exemplary embodiment of this general type is depicted in FIG. 10. Thus in general, in some embodiments a secondary line of weakness might comprise discontinuous recesses (of, e.g. any of the general types depicted in FIGS. 5-9) with a space in between two neighboring recesses chosen to coincide with the intersection of the secondary line of weakness with a primary line of weakness. Such approaches, while still enabling tearing along a secondary line of weakness to be performed when desired, might provide that tearing along a primary line of weakness is unlikely to inadvertently shift direction and cause tearing along a secondary line of weakness. It will be appreciated that there are many such ways to achieve such ends. For example, continuous or discontinuous primary recesses (whether grooves or some other structure), might be provided that are deeper than secondary recesses, and/or are more closely spaced, and/or having sharper bottoms, any or all of which might serve to more efficiently promote tearing. In specific embodiments, the depth of recesses that provide secondary lines of weakness may be less than about 80%, 70%, 60%, or 50%, of the depth of recesses that provide primary lines of weakness (whether such recesses are continuous or discontinuous). In the particular case of a secondary line of weakness being comprised of discontinuous recesses (e.g., as shown in FIG. 10), a recess may terminate abruptly as it nears a primary line of weakness (e.g., as in FIG. 10), or, it may gradually become shallower as it nears the primary line of weakness.

Figure 3:
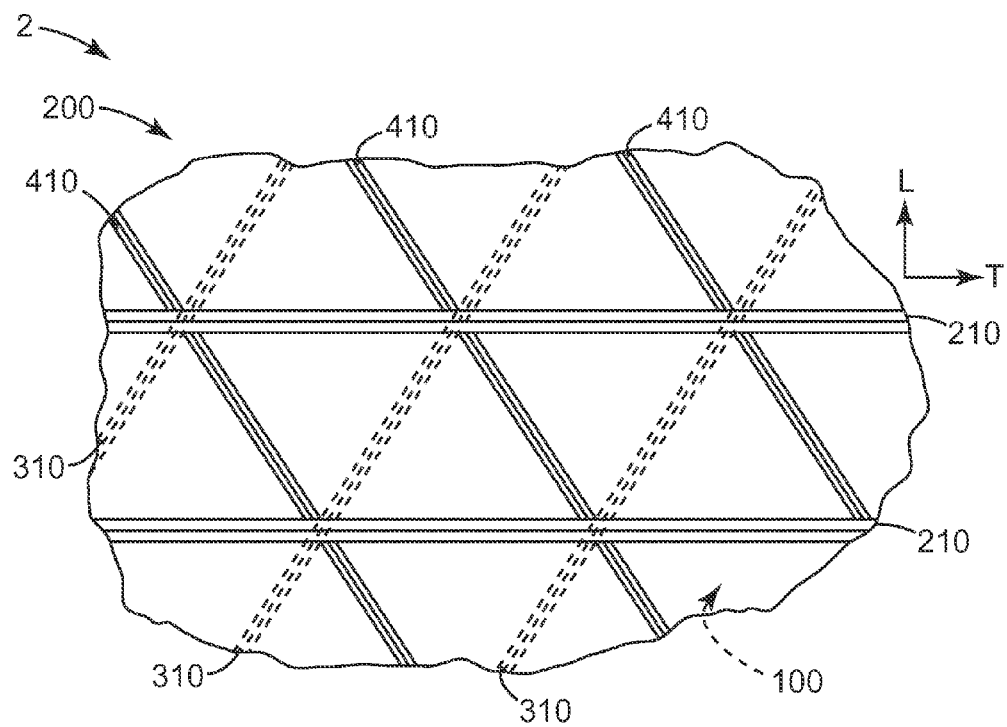
FIG. 3 is a plan view of a portion of a major side of another tape backing comprising exemplary microstructured hand-tear patterns.
Figure 4:
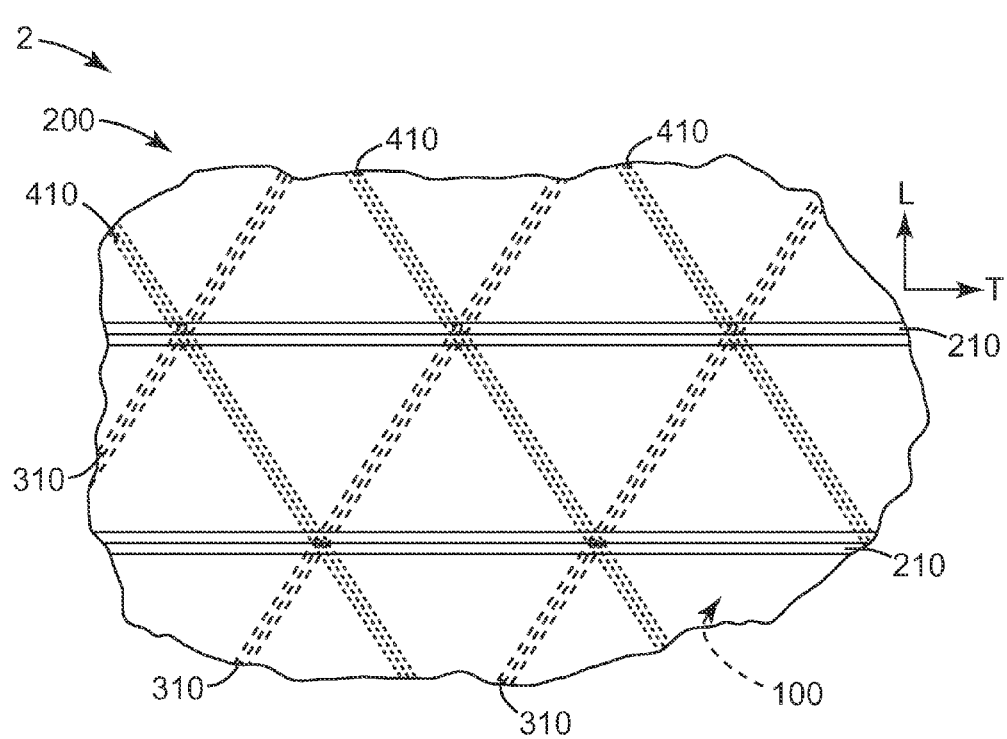
FIG. 4 is a plan view of a portion of a major side of another tape backing comprising exemplary microstructured hand-tear patterns.

It is emphasized that the patterns of primary and secondary lines of weakness shown in FIGS. 2-4 are exemplary patterns, and that any suitable pattern may be chosen within the overall designs disclosed herein. Such patterns may be characterized e.g. in terms of the angles between the secondary lines of weakness and the primary lines of weakness, and the angles between the first and second secondary lines of weakness (if present), and in terms of the spacing between the primary lines of weakness relative to the spacing between the secondary lines of weakness. Such relationships may be considered in further detail in reference to the exemplary design of FIG. 11.

Figure 11:
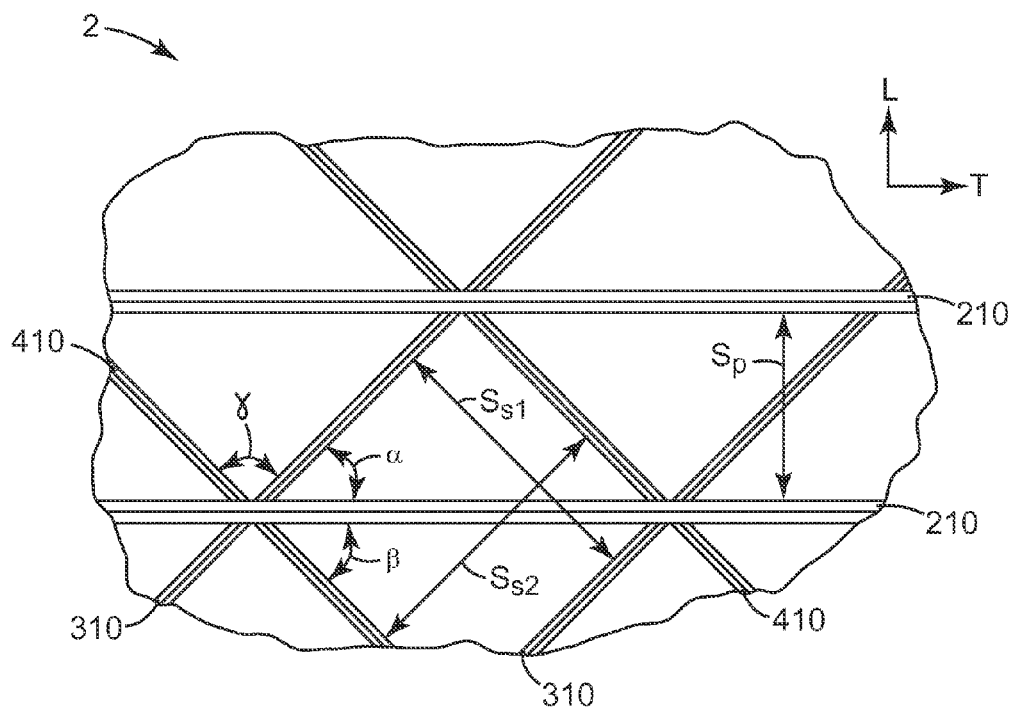
FIG. 11 is a plan view of a portion of a major side of another tape backing comprising exemplary microstructured hand-tear patterns.

In various embodiments, (first) secondary lines of weakness 310 may be oriented at an included angle α (alpha), as shown in FIG. 11, of about 25-65 degrees, of about 35-55 degrees, or of about 40-50 degrees, relative to the long axis of the lines of weakness of primary microstructured hand-tear pattern 203. In particular embodiments, secondary lines of weakness 310 may be oriented at an angle of about 45 degrees relative to the long axis of the lines of weakness of primary microstructured hand-tear pattern 203, as shown in the specific embodiment of FIG. 11.

In further embodiments, second secondary lines of weakness 410 (if present) may be oriented at an included angle 13 (beta) of about 35-55 degrees, or of about 40-50 degrees, relative to the long axis of the lines of weakness of primary microstructured hand-tear pattern 203. In specific embodiments, second secondary lines of weakness 410 may be oriented at an angle of about 45 degrees relative to the long axis of the lines of weakness of primary microstructured hand-tear pattern 203, as shown in the specific embodiment of FIG. 11. In various embodiments, second secondary lines of weakness 410 of secondary hand-tear pattern 403 may be oriented at an included angle γ (gamma) of about 90-70, 90-80, or 90-85 degrees with respect to the long axis of the first secondary lines of weakness 310 of first secondary microstructured hand-tear pattern 303. In particular embodiments, second secondary lines of weakness 410 may be oriented at an angle of about 90 degrees relative to the long axis of first secondary lines of weakness 310, as shown in the specific embodiment of FIG. 11.

It will be appreciated based on the disclosures herein that embodiments of the type depicted in FIG. 11, in which the primary lines of weakness are at least substantially aligned with the transverse axis of backing 2, and in which the secondary lines of weakness are each oriented at an angle of about 45 degrees relative to the primary lines of weakness, and in which the first and second secondary lines of weakness are oriented at an angle of about 90 degrees relative to each other, may have particular advantages. That is, they may allow lengths of tape 1 to be torn at approximately 45 degree angles from the transverse axis of the tape, if desired, which may allow the terminal ends of adjacent lengths of tape to be abutted against each other in a corner in the manner described previously.

It is not necessary that the intersections of first and second secondary lines of weakness with each other must have any particular relationship to the intersections of these secondary lines of weakness with the primary lines of weakness. Thus in some embodiments, the spacing and orientation of the secondary lines of weakness may have no particular relationship with that of the primary lines of weakness, and such intersections of secondary and primary lines of weakness as do occur may have no particular pattern (e.g., may be random). Such might be the case whether the secondary lines of weakness are provided on the same side, or the opposite side, as the primary lines of weakness. However, in other embodiments a predetermined relationship may be desired. In particular embodiments, it may be desired that intersections of first and second secondary lines of weakness may generally, substantially or exactly coincide with their intersections with the primary lines of weakness. One such design of this type is depicted in FIG. 11. It will be appreciated that such a design may require that the spacing "$S_p$" between primary lines of weakness 210 must be different from the spacing "$S_{s1}$" between the first secondary lines of weakness 310 and the spacing "$S_{s2}$" between the second secondary lines of weakness 410. For example, in the design of FIG. 11, the spacing "$S_{s1}$" between the first secondary lines of weakness 310 is essentially equal to the spacing "$S_{s2}$" between the second secondary lines of weakness 410. In contrast, the spacing "$S_p$" between the primary lines of weakness 210 is less than spacings "$S_{s1}$" and "$S_{s2}$". This can be contrasted to the exemplary designs of FIGS. 2-4 and 10, in which the spacing between the lines of weakness of all three hand-tear patterns is essentially equal.

In one specific embodiment, the spacing $S_p$ between primary lines of weakness may be about 0.71 (i.e., sine 45°) times the spacings "$S_{s1}$" and "$S_{s2}$" between secondary lines of weakness. It will be appreciated that such a spacing may facilitate designs of the type shown in FIG. 11. In other embodiments, the spacing between primary lines of weakness may be an integer multiple of about 0.71. In such cases, not every intersection of a first secondary line of weakness with a secondary line of weakness may necessarily correspond with an intersection of the first (or second) secondary line of weakness with a primary line of weakness; however, every intersection of a primary line of weakness with a first secondary line of weakness may also coincide with an intersection of the primary line of weakness with a second secondary line of weakness, and vice versa.

It will be appreciated that such designs may be used irrespective of whether or not the primary and/or secondary lines of weakness comprise continuous recesses, discontinuous recesses, or a mixture of both.

Backing 2 and all microstructured hand tear patterns thereof are defined herein as constituting a plastic unit made of a monolithic plastic material. By this is meant that the portions of material (e.g., surfaces) that define the recessed features (e.g., grooves, valleys, holes, etc.) that provide lines of weakness of the hand-tear patterns are integrally connected to backing 2 and were formed by being molded therewith. The plastic material of backing 2 is defined as a moldable polymeric thermoplastic material that is not a foamed or porous material. In some embodiments, the plastic material may be noncellulosic, meaning that it contains less than about 5 wt. % cellulosic material (e.g., cellulose, paper, regenerated cellulose, wood fibers, wood flour, etc., with, in this context, cellulose acetate and the like not considered to be cellulosic materials). In particular embodiments, the plastic material may be melt-processable, e.g. extrudable. The moldable polymeric thermoplastic material may be made from, or include, any of a variety of materials. Homopolymers, copolymers and blends of polymers may be useful, and may contain a variety of additives. Suitable thermoplastic polymers may include, for example, polyolefins such as polypropylene or polyethylene; polystyrene, polycarbonate, polymethyl methacrylate, ethylene vinyl acetate copolymers, acrylate-modified ethylene vinyl acetate polymers, ethylene acrylic acid copolymers, nylon, polyvinylchloride, and engineering polymers such as polyketones or polymethylpentanes. Mixtures of such polymers may also be used. In specific embodiments, the plastic material of backing 2 does not contain any vinyl-chloride-based polymers.

In some embodiments, the plastic material may be a polyolefinic material, meaning that the plastic material is made up of at least 80 wt. % polyalkene polymers, including any homopolymers, copolymers, blends, etc. thereof (not counting the weight of any mineral fillers and the like that may be present). In further embodiments, the plastic material may comprise at least 90 wt. %, at least 95 wt. %, or at least 98 wt. %, polyolefinic material. In some embodiments, the polyolefinic material may be a polyethylenic material, meaning that the polyolefinic material contains at least about 80 wt. % of polyethylene polymers (again, not counting the weight of any mineral fillers and the like that may be present). In further embodiments, the polyolefinic material may contain at least about 90 wt. %, at least about 95 wt. %, or at least about 98 wt. % of polyethylene polymers. (In this context, by polyethylene polymers are meant polymers comprised of at least 95% ethylene units. In some embodiments, the polyethylene polymers are polyethylene homopolymers.) Suitable polyethylene homopolymers for use in backing 2 may include e.g. high-density polyethylene, medium-density polyethylene, low-density polyethylene, linear low-density polyethylene, ultra-low-density polyethylene, and the like.

Pressure-sensitive adhesive 800 may be provided on either major side of backing 2. That is, it can be provided on the same side as either or both of the primary hand-tear pattern and the secondary hand-tear pattern(s), as long as it does not unacceptably interfere with the desired ability to hand-tear the backing. Pressure-sensitive adhesives are normally tacky at room temperature and can be adhered to a surface by application of, at most, light finger pressure and thus may be distinguished from other types of adhesives that are not pressure-sensitive. A general description of useful pressure-sensitive adhesives may be found in the Encyclopedia of Polymer Science and Engineering, Vol. 13, Wiley-Interscience Publishers (New York, 1988). Additional description of useful pressure-sensitive adhesives may be found in the Encyclopedia of Polymer Science and Technology, Vol. 1, Interscience Publishers (New York, 1964). Any suitable composition, material or ingredient can be used in pressure-sensitive adhesive 800. Pressure-sensitive adhesives often utilize one or more thermoplastic elastomers, e.g. in combination with one or more tackifying resins.

General categories of exemplary materials which may be suitable for use in pressure-sensitive adhesive 800 include e.g. elastomeric polymers based on (e.g., the reaction product of) acrylate and/or methacrylate materials, natural or synthetic rubbers, block copolymers, silicones, and so on. (As used herein, terms such as (meth)acrylate, (meth (acrylic), and the like, refer to both acrylic/acrylate, and methacrylic/methacrylate, monomer, oligomers, and polymers derived therefrom). Any suitable tackifying resin or combination thereof may be used therein. Additionally, pressure-sensitive adhesive 800 can contain additives such as plasticizers, fillers, antioxidants, stabilizers, pigments, and the like. Additional information on materials (thermoplastic elastomers, tackifying resins, and other additives) which may find use in pressure-sensitive adhesive 800 may be found e.g. in U.S. Pat. No. 6,632,522 to Hyde et al., which extensively discusses such materials and which is incorporated by reference herein for this purpose.

In certain embodiments, pressure-sensitive adhesive 800 may be natural-rubber-based, meaning that a natural rubber elastomer or elastomers make up at least about 20 wt. % of the elastomeric components of the adhesive (not including any filler, tackifying resin, etc.). In further embodiments, the natural rubber elastomer makes up at least about 50 wt. %, or at least about 80 wt. %, of the elastomeric components of the adhesive. In some embodiments, the natural rubber elastomer may be blended with one or more block copolymer thermoplastic elastomers (e.g., of the general type available under the trade designation KRATON from Kraton Polymers, Houston, Tex.). In specific embodiments, the natural rubber elastomer may be blended with a styrene-isoprene radial block copolymer), in combination with natural rubber elastomer, along with at least one tackifying resin. Adhesive compositions of this type are disclosed in further detail in US Patent Application Publication 2003/0215628 to Ma et al., which is incorporated by reference herein for this purpose.

A low adhesion backsize (e.g., 903 as shown in FIG. 1) may be provided on a major side of backing 2 (e.g., a major side opposite that bearing the pressure-sensitive adhesive), such that when tape 1 is in a self-wound condition (e.g., as roll 20), an outwardmost major surface of pressure-sensitive adhesive 800 is in contact with an outermost surface of the low adhesion backsize. Such a low adhesion backsize can be any suitable composition. The composition of such a low adhesion backsize may be chosen (e.g., in combination with the composition of pressure-sensitive adhesive 800) to provide an appropriate level of release so that roll 20 can be unwound as desired. As disclosed herein, in some embodiments a low adhesion backsize may also provide an enhanced ability to anchor paint which is deposited thereupon.

General categories of exemplary materials which may be suitable for inclusion in a low adhesion backsize include e.g. (meth)acrylic polymers, urethane polymers, vinyl ester polymers, vinyl carbamate polymers, fluorine-containing polymers, silicone-containing polymers, and combinations thereof. In some embodiments, a low adhesion backsize may comprise the reaction product of (meth)acrylic monomers, oligomers, and the like, noting that this general category encompasses any ester or nitrile of acrylic acid or methacrylic acid. Suitable materials of this type include, but are not limited to, octadecyl acrylate, acrylic acid, methyl acrylate, ethyl acrylate, isooctyl acrylate, ethylhexyl acrylate, butyl acrylate, hydroxyethyl acrylate, hydroxypropyl acrylate and acrylonitrile. The corresponding (meth)acrylate of any of these materials may be likewise used. Any other vinyl monomers (e.g., that are copolymerizable with (meth)acrylic monomers) may also be included, e.g. N-vinyl pyrrolidone, styrene, acrylamide, vinyl acetate, and so on. In some embodiments, low adhesion backsize 903 may comprise a composition comprising long alkyl side chain polymers (e.g., containing 12-22 carbon atoms in the side chains) attached e.g. to a (meth)acrylic backbone, as exemplified e.g. by the reaction product of octadecyl acrylate, acrylic acid, acrylonitrile, and methyl acrylate. In some embodiments of this general type, the octadecyl acrylate may comprise up to e.g. about 60 wt. % of the reaction mixture. In specific embodiments, the octadecyl acrylate comprises no more than about 51 wt. % of the reaction mixture. In some embodiments, low adhesion backsize 903 may include at least some (meth)acrylic acid groups. In various embodiments, (meth)acrylic acid groups may be present at least at about 2 or 5 weight percent. In further embodiments, (meth) acrylic acid groups may be present at most at about 16, 10 or 5 weight percent.

In some embodiments, low adhesion backsize 903 may comprise a silicone-containing material. In various embodiments, such materials may comprise: a silicone backbone with non-silicone (e.g., (meth)acrylate) side chains; a non-silicone (e.g., (meth)acrylate) backbone with silicone side chains; a copolymer backbone comprising silicone units and non-silicone (e.g., (meth)acrylate) units; and the like. Silicone-polyurea materials, silicone-polyurea-polyurethane materials, silicone-polyoxamide materials, siloxane-iniferter-derived compositions, and the like, may also be suitable.

In a certain embodiments, the silicone-containing material of low adhesion backsize 903 comprises a reaction product of a vinyl-functional silicone macromer having the general formula of Formula I:

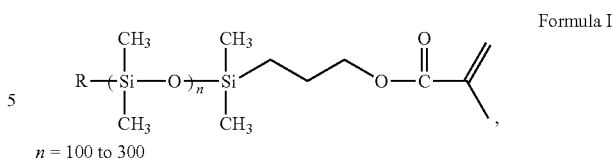

Formula I $n = 100$ to $300$ and R is H or an alkyl group;

In certain embodiments, the silicone-containing material of low adhesion backsize 903 comprises a reaction product of a mercapto-functional silicone macromer having the general formula of Formula IIa, IIb, or IIc or mixtures thereof:

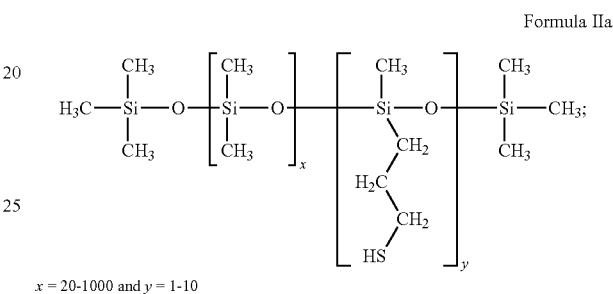

Formula IIa $x = 20\text{-}1000$ and $y = 1\text{-}10$

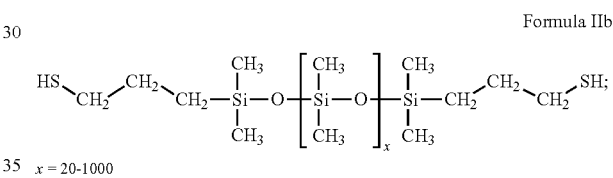

Formula IIb $x = 20\text{-}1000$

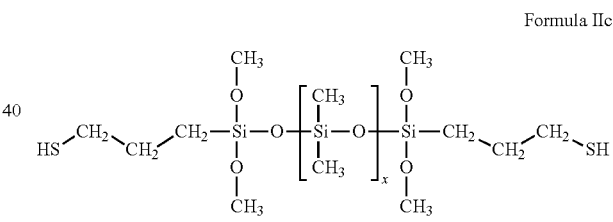

Formula IIc $x = 20\text{-}1000$

Further details of mercapto-functional silicone macromers and of the production of low adhesion backsize compositions using such macromers can be found in U.S. Pat. No. 5,032,460 to Kantner et al.

In various embodiments, any of the above silicone macromers may be used in combination with meth(acrylic) monomers and/or with any other vinyl monomers. Such monomers may be chosen, for example, in order to achieve a suitable glass transition temperature range for the low adhesion backsize material. In some embodiments, the silicone macromer of Formula IIa may be used, at approximately 15-35 weight percent of the total reactants, with the balance of the reactants including at least one high $T_g$ (meth)acrylic monomer, at least one low $T_g$ (meth)acrylic monomer, and at least one (meth)acrylic acid monomer. In specific embodiments, the low $T_g$ monomer is methyl acrylate, the high $T_g$ monomer is methyl methacrylate, and the (meth)acrylic acid monomer is methacrylic acid. In further embodiments, in such compositions the silicone macromer of Formula IIa is used at approximately 20-30 wt. %. In some embodiments comprising silicone macromers, low adhesion backsize 903 may include at least 2 wt. % of (meth)acrylic acid groups. In further embodiments, the amount of methacrylic acid in such compositions is between 2 and 16 wt. %, or between 5 and 10 wt. %. (These and other weight percentages of reactants listed herein are relative to the total reactants, not including any solvent or other components that may be present in the reaction mixture or the low adhesion backsize product, unless otherwise noted).

In some embodiments, a major side of backing 2 of tape 1 may comprise a microstructured paint-retention pattern so as to enhance the retention of liquid paint by the tape. Such a microstructured paint-retention pattern can be provided on the same major side (200) of backing 2 as primary hand-tear pattern 203; or, on an opposite side (100). The spacing and arrangement of the partitions of such a paint-retention pattern may be arranged in relation (e.g., predetermined relation) to the primary hand-tear pattern; or, it may have no particular relation thereto (e.g., can be randomly arranged relative thereto).

Figure 12:
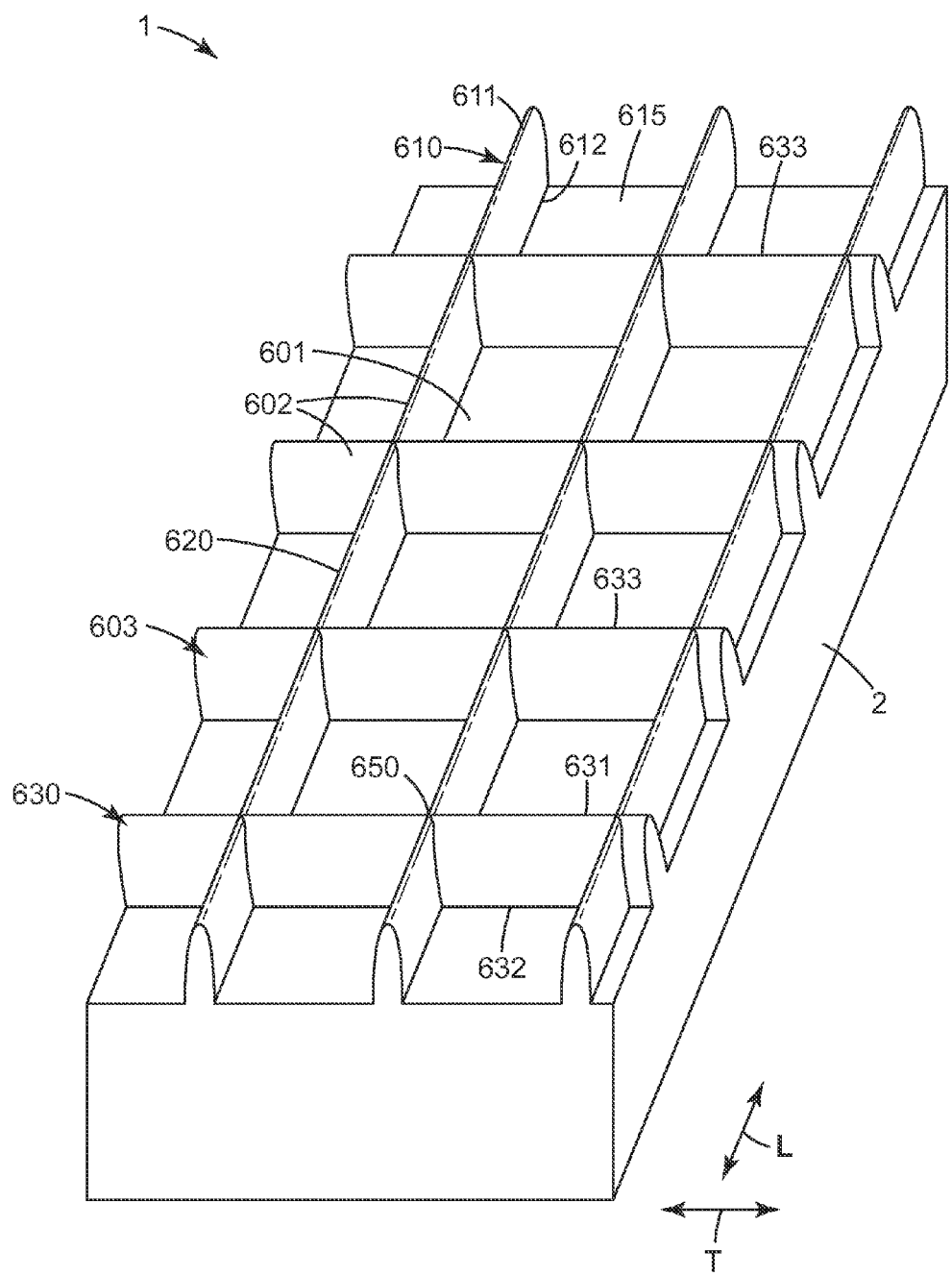
FIG. 12 is a perspective view of a portion of a major side of another tape backing comprising an exemplary microstructured paint-retention pattern.

An exemplary microstructured paint-retention pattern 603 is shown in FIG. 12 (noting that for convenience of illustration, only backing 2 and paint-retention pattern 603 are shown, with hand-tear patterns, pressure-sensitive adhesive and/or low adhesive backsize omitted). By microstructured paint-retention pattern 603 is meant that a major side of backing 2 of tape 1 comprises a multiplicity of microreceptacles 601 that are defined (i.e., bounded, whether continuously or discontinuously) by microstructured partitions 602 (e.g., as shown in exemplary manner in FIG. 12) and that are configured to capture and/or retain liquid paint that impinges upon that major side of tape 1. By microstructured partitions is meant that partitions 602 (which may be continuous or discontinuous) each comprise a predetermined, molded structure. It will be appreciated that molded structures and features as defined herein (with respect to partitions 602 as well as to recesses that provide lines of weakness) are distinguished from features that are achieved by post-processing (e.g., by coating, depositing, ablation, perforation, punching, drilling, and the like). By microstructured partition is also meant that a partition 602 comprises, somewhere along its length, a height ranging from about 10 microns to about 120 microns (e.g., above major surface 615). By microstructured partition is further meant that a partition has a dimension ranging from about 5 microns to about 400 microns along at least one axis that is orthogonal to the plane of backing 2.

In various embodiments, the height of partitions 602 (whether in the form of continuous elongate ribs, discontinuous rib segments, posts, etc.) may be at most about 110 microns, at most about 100 microns, at most about 90 microns, or at most about 80 microns. In further embodiments, the height of partitions 602 may be at least about 20 microns, at least about 30 microns, at least about 40 microns, or at least about 50 microns. In various embodiments, at least some of partitions 602 may be tapered (e.g., as shown in exemplary illustration in FIG. 12) so as to comprise a top with at least one dimension, e.g. lateral width, that is less than 80%, less than about 60%, or less than about 40%, of the corresponding dimension of the partition base.

In some embodiments, microstructured partitions 602 may comprise a multiplicity of first elongate (e.g., linear) partitions 610 that may not physically intersect with each other, and a multiplicity of second elongate partitions 630 that may not physically intersect with each other, with at least some of first partitions 610 intersecting with at least some of second partitions 630 at intersections 650 so as to define microreceptacles 601 thereby. Such intersecting of first partitions 610 with second partitions 630 may comprise actual physical intersections of first and second partitions 610 and 630, as with intersections 650 of FIG. 12. Or, such an intersection of first partitions 610 with second partitions 630 may comprise the intersecting of paths followed by discontinuous partitions.

In some embodiments, first partitions 610 may be strictly linear and parallel to each other along substantially their entire elongate length; likewise, second partitions 630 may be strictly linear and parallel to each other along substantially their entire elongate length. The spacings between individual partitions 610, and/or between individual partitions 630, may be constant, or may vary. In some embodiments, first elongate partitions 610 may be provided so that their long axes are generally orthogonal, or strictly orthogonal (e.g., oriented at 90 degrees) to the long axes of second partitions 630. First and second partitions 610 and 630 may be provided at any convenient orientation with regard to primary lines of weakness 210 of backing 2. However, in some embodiments some or all of one set of partitions (e.g., partitions 630) may be substantially aligned with primary lines of weakness 210, or may be aligned with plus or minus about 5 degrees with lines of weakness 210. It will be appreciated that such arrangements may minimize the number of partitions 630 that must be torn through (broken) in order to hand-tear backing 2 along a primary line of weakness 210.

In specific embodiments, first partitions 610, and second partitions 630, may each comprise elongate ribs, e.g. continuous ribs (as exemplified by first elongate ribs 620 and second elongate ribs 633 of FIG. 12). Thus, in embodiments of the type exemplified in FIG. 12, backing 2 may comprise a multiplicity of first partitions 610, each partition 610 comprising a continuous rib 620 with base 612 and top 611, with a height, width, and an elongate length. In some embodiments, the elongate length of first partitions 610 may be generally, e.g. strictly, aligned with the longitudinal axis of backing 2 and of tape 1. The same major side of backing 2 may additionally comprise a multiplicity of second partitions 630, each partition 630 comprising a continuous rib 633 with base 632 and top 631, with a height, width, and an elongate length. In some embodiments, the elongate length (long axis) of second partitions 630 may be generally, e.g. strictly, aligned with the transverse axis of backing 2 and of tape 1. As shown in the exemplary design of FIG. 12, in some embodiments elongate ribs 620 and elongate ribs 633 may each comprise a height that is uniform along the length of the rib. In particular embodiments, the height of ribs 620 may be equal to that of ribs 633, again as shown in FIG. 12.

However, from the above discussions it will be apparent that in many of the designs herein, a microstructured paint-retention pattern may be configured such that at least some first partitions 610 may traverse (i.e., intersect) at least some primary lines of weakness 210 (whether they are on the same side of backing 2 or not). Given this, in various embodiments first partitions 610 may be designed so as to enhance the ability of backing 2 to be hand-torn along at least the primary lines of weakness 210 of primary hand-tear pattern 203. That is, at least some of first partitions 610 may thus be designed and/or arranged so as to minimize the resistance to hand-tearing that they provide. Thus, in such embodiments, at least some of partitions 610 (e.g., elongate ribs 620) may be shorter in height and/or thinner in thickness than second partitions 630 (e.g., second elongate ribs 633), at least in locations in which they intersect with a line of weakness of a hand-tear pattern. In specific embodiments, partitions 610

(e.g., elongate ribs 620) may comprise a height that is less than about 70% of the height of second partitions 630 (e.g., second elongate ribs 633). Such shorter and/or thinner ribs may present less resistance to being torn through in the process of hand-tearing. Gaps, notches, and in general, any suitable discontinuities may be provided in partitions 610 in specific locations as desired to enhance tearing along a line of weakness.

In some embodiments, a major surface of backing 2 may comprise some areas with a surface that is textured so as to impart low gloss, and some areas that are generally flat (e.g., near-optically-smooth) so as to impart high gloss (it will be understood that these effects may be mainly present in the plano surface of the major surface, e.g. in between the various lines of weakness). Such high and low gloss areas may be arranged in any suitable manner, e.g. to provide a decorative pattern, an informational indicia, and so on.

In an exemplary process for making backing 2 and tape 1, an extruder can be used to extrude molten polymeric thermoplastic extrudate, one major surface of which is contacted with a tooling roll which bears on its surface the negative of the desired primary microstructured hand-tear pattern. The same roll may also bear the negative of one or more desired secondary microstructured hand-tear patterns. Or, an opposing backing roll may bear the negative of one or both of the secondary microstructured hand-tear-patterns. One of the rolls may also bear the negative of a desired paint-retention pattern, if desired. Conveniently, the contacting may be done essentially simultaneously, e.g. by impinging molten extrudate into a narrow gap (nip) between two rolls (or, in general between any two molding surfaces). A molding surface, with the negative of the desired hand-tear-imparting features (and optionally, paint-retention-imparting features) thereon, may be obtained e.g. by engraving, knurling, diamond turning, laser ablation, electroplating or electrodeposition, or the like, as will be familiar to those of skill in the art. If no microstructure (e.g., a hand-tear pattern, paint-retention pattern, etc.) is to be imparted to a major surface of the backing (e.g., the major surface of second major side 100), a molding surface (e.g., of a roll) may be provided that comprises e.g. a matte finish, a polished surface, etc., as desired.

A low adhesion backsize, if desired to be present, can be disposed (e.g., as a layer) on either desired major side of backing 2, e.g. by using a coater of any suitable type. In many cases such processes may involve the deposition of an low adhesion backsize (precursor) onto a major side of backing 2 and then transforming the precursor into low adhesion backsize 903 (e.g., by removal of solvent or water, by curing or crosslinking, etc.). A pressure-sensitive adhesive can be disposed (e.g., as a layer) on a desired major side of backing 2 (conveniently, a side opposite a low adhesion backsize if one is present), e.g. by using a coater of any suitable type. In many cases such processes may involve the deposition of a pressure-sensitive adhesive (precursor) onto a major side of backing 2 and then transforming the precursor into pressure-sensitive adhesive (e.g., by removal of solvent or water, by curing or crosslinking, etc.).

As made by any suitable process, tape 1 may be conveniently provided in the form of a roll 20 as shown in exemplary manner in FIG. 1. In some embodiments, tape 1, and roll 20 thereof, do not include any kind of release liner (e.g., a paper or plastic film liner, that is separate from backing 2 and that bears a release surface, whether supplied by the film liner itself or by a coating thereupon). That is, roll 20 may be a self-wound roll that is wound directly upon itself with outermost surface 801 of pressure-sensitive adhesive 800 in releasable contact with a surface of backing 2 (e.g., with an outwardmost surface of low adhesion backsize 903 thereupon). In order to use tape 1, a length of the tape may be removed from an elongate length, e.g. a roll 20, of the tape. This may be performed by hand-tearing the tape across its transverse width, at a desired location, although scissors, a knife, or any other suitable cutting implement may be used if convenient. The hand-tearing may be performed by, for example, grasping, with each hand, portions of the tape that longitudinally bracket the desired tear location, and moving one portion of the tape in a first direction and the other portion in a generally opposite direction so as to apply shear force at the desired tear location to initiate and propagate a tear at least generally transversely across the width of the tape. The tearing can be along a primary line of weakness, or along a secondary line of weakness, as described herein. If desired, tape 1 may be used in conjunction with a masking film, and may be conveniently applied (e.g., along with such a masking film) to a surface by use of a masking tool, e.g. the product available from 3M Company of St. Paul, Minn., under the trade designation 3M HAND-MASKER DISPENSER. Tape 1 having been applied to a desired portion of a surface, adjacent portions of surfaces can then be painted as desired (the term paint is used broadly herein and encompasses any coating, primer, varnish, lacquer, and the like). At any suitable time (e.g., after the paint has dried to a desired extent), tape 1 can then be removed from the surface.

Tape 1 as disclosed herein may thus optionally comprise any or all of a microstructured paint-retention pattern, a low adhesive backsize, and a combination of high and low gloss areas, in any desired combination. Thus in summary, backing 2 and tape 1 may comprise various features and combinations thereof, which may be described with reference to a primary microstructured hand-tear pattern that is provided on a first major side of backing 2. At least a first secondary microstructured hand-tear pattern is provided, which may be on the first or second major side of backing 2, and which in some embodiments may be the only secondary hand-tear pattern that is present. In other embodiments, a second secondary microstructured hand-tear pattern may be optionally provided, and may be on the first or second major side of backing 2 (and, in various embodiments, may be on the same side or the opposite side from the first secondary hand-tear pattern). A pressure-sensitive adhesive may be provided on backing 2 (e.g., so as to form tape 1), and may be on either the first or the second major side. A low adhesive backsize may be optionally provided on backing 2, and may be on either the first or the second major side (although conventionally such a low adhesion backsize will be on the opposite side from the pressure-sensitive adhesive). A microstructured paint-retention pattern may be optionally provided, which may be on the first or second major side of backing 2. Thus in various embodiments, such a paint-retention pattern may be on the same or an opposite side as the primary hand-tear pattern, and may be on the same or an opposite side as the secondary hand-tear pattern(s). (If a paint-retention pattern is present, it may be most convenient for the pressure-sensitive adhesive to be on the opposite side of the backing from the paint-retention pattern). Area of high gloss and low gloss as described above may be provided, and may be on the first or second major side of backing 2 and so may be on a same side or an opposite side as the various features disclosed above.

Further details of microstructured hand-tear patterns that might be useful in the backings and tapes herein, and details of microstructured paint-retention patterns, low-adhesion backsizes, backings with high and low gloss areas, and methods of making such items and features, are available in the following patent applications which are each incorporated by reference herein in their entirety:

U.S. patent application Ser. No. 13/042,536 filed Mar. 8, 2011 and entitled Microstructured Tape; U.S. Provisional Patent Application Ser. No. 61/512,225 filed Jul. 27, 2011 and entitled Hand-Tearable Masking Tape with Low Adhesion Backsize; U.S. Provisional Patent Application Ser. No. 61/512,218 filed Jul. 27, 2011 and entitled Hand-tearable Masking Tape with Silicone-containing Low Adhesion Backsize; U.S. Provisional Patent Application Ser. No. 61/604,120 filed Feb. 28, 2012 and entitled Microstructured Tape Comprising Coextensive, Intersecting Paint-Retention and Hand-Tear Patterns; and U.S. Provisional Patent Application Ser. No. 61/604,124 filed Feb. 28, 2012 and entitled Substrate Comprising High and Low Gloss Areas with a Physical Microstructure Superimposed Thereon.

Although discussed herein primarily in the context of being used for masking applications e.g. in connection with painting, those of ordinary skill will appreciate that tape 1 as disclosed herein may find use in other applications as well.

LIST OF EXEMPLARY EMBODIMENTS

Embodiment 1

A hand-tearable masking tape, comprising: a plastic backing comprising a longitudinal axis and a transverse width and axis, and comprising a first major side and an oppositely-facing second major side; wherein the first major side of the backing comprises a primary microstructured hand-tear pattern comprising a multiplicity of primary lines of weakness at least some of which comprise a long axis that is oriented within plus or minus 10 degrees of the transverse axis of the backing, and wherein the first or second major side of the backing comprises a first secondary microstructured hand-tear pattern comprising a multiplicity of first secondary lines of weakness at least some of which comprise a long axis that is oriented at an included angle of about 25 degrees to about 90 degrees relative to the long axis of the primary lines of weakness, and, a pressure-sensitive adhesive disposed on the first or second major side of the backing.

Embodiment 2

The tape of embodiment 1 wherein the first or second major side of the backing comprises a second secondary microstructured hand-tear pattern comprising a multiplicity of second secondary lines of weakness at least some of which comprise a long axis that is oriented at an included angle of about 25 to about 65 degrees relative to the long axis of the primary lines of weakness, and that is oriented at an included angle of about 50 degrees to about 90 degrees relative to the long axis of the first secondary lines of weakness of the first secondary hand-tear pattern.

Embodiment 3

The tape of embodiment 2 wherein the primary lines of weakness are oriented within plus or minus five degrees of the transverse axis of the backing, wherein the first secondary lines of weakness are oriented at an included angle of about 40 to about 50 degrees relative to the long axis of the primary lines of weakness, and wherein the second secondary lines of weakness are oriented at an included angle of about 40 to about 50 degrees relative to the long axis of the primary lines of weakness and at an included angle of about 80 to about 90 degrees relative to the long axis of the first secondary lines of weakness.

Embodiment 4

The tape of embodiment 2 wherein the primary lines of weakness are oriented within plus or minus two degrees of the transverse axis of the backing, wherein the first secondary lines of weakness are oriented at an included angle of about 45 degrees relative to the long axis of the primary lines of weakness, and wherein the second secondary lines of weakness are oriented at an included angle of about 45 degrees relative to the long axis of the primary lines of weakness and at an included angle of about 90 degrees relative to the long axis of the first secondary lines of weakness.

Embodiment 5

The tape of any of embodiments 2-4 wherein the first and second secondary lines of weakness are provided on the first major side of the backing.

Embodiment 6

The tape of any of embodiments 2-4 wherein the first and second secondary lines of weakness are provided on the second major side of the backing.

Embodiment 7

The tape of any of embodiments 2-6 wherein at least some of the primary lines of weakness are continuous primary lines of weakness each comprising a continuous groove that extends across the entire transverse width of the first side of the backing, and wherein at least some of the first and second secondary lines of weakness are discontinuous secondary lines of weakness each comprising a multiplicity of recesses spaced along a long axis.

Embodiment 8

The tape of embodiment 7 wherein the discontinuous lines of weakness each comprise a discontinuity at a location at which the discontinuous line of weakness intersects with a continuous primary line of weakness.

Embodiment 9

The tape of any of embodiments 7-8 wherein at least some of the recesses of the multiplicity of recesses that provide the discontinuous secondary lines of weakness, comprise a depth that is less than about 70% of the depth of the continuous primary lines of weakness.

Embodiment 10

The tape of any of embodiments 1-9 further comprising a low adhesion backsize disposed on the first or second major side of the backing.

Embodiment 11

The tape of embodiment 10 wherein the low adhesion backsize comprises a silicone material comprising the reaction product, with one or more (meth)acrylic monomers and/or oligomers and/or vinyl monomers and/or oligomers, of a silicone macromer chosen from the following: a vinyl-functional silicone macromer having the general formula of Formula I:

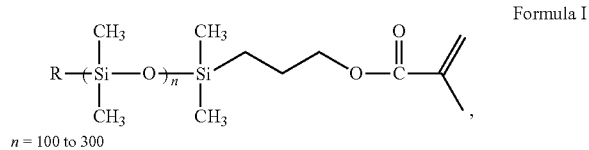

Formula I $n = 100$ to $300$ and R is H or an alkyl group;
or, a mercapto-functional silicone macromer having the general formula of Formula IIa, IIb, or IIc:

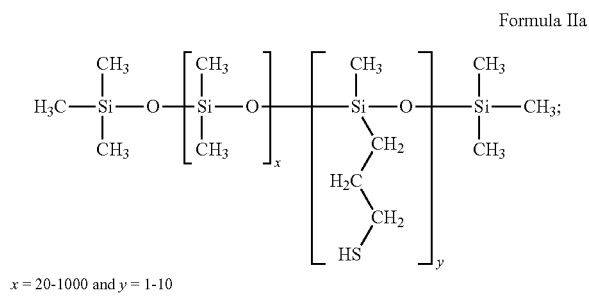

Formula IIa $x = 20\text{-}1000$ and $y = 1\text{-}10$

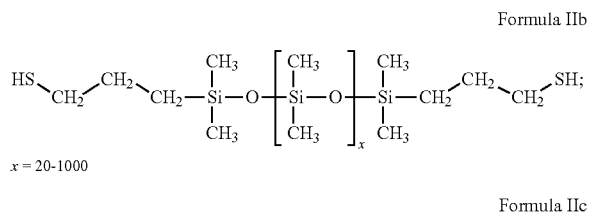

Formula IIb $x = 20\text{-}1000$

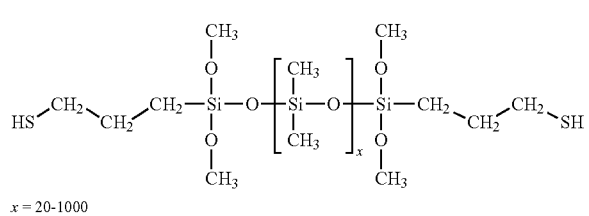

Formula IIc $x = 20\text{-}1000$ or, combinations or mixtures or any of the above silicone macromers.

Embodiment 12

The tape of embodiment 10 wherein the low adhesion backsize is provided on the first major side of the backing.

Embodiment 13

The tape of embodiment 10 wherein the low adhesion backsize is provided on the second major side of the backing.

Embodiment 14

The tape of any of embodiments 1-13 further comprising a microstructured paint-retention pattern that is provided on either the first or the second major side of the backing.

Embodiment 15

The tape of embodiment 14 wherein the microstructured paint-retention pattern is collectively provided by a first set of microstructured partitions in the form of first non-intersecting elongate ribs, and a second set of microstructured partitions in the form of second non-intersecting elongate ribs, and wherein the elongate ribs of the first set of microstructured partitions comprise long axes that are generally orthogonal to the long axes of the elongate ribs of the second set of microstructured partitions.

Embodiment 16

The tape of embodiment 15 wherein the long axes of the elongate ribs of the second set of microstructured partitions are aligned within plus or minus about 5 degrees of the long axes of the primary lines of weakness and are aligned within plus or minus about 5 degrees of the transverse axis of the backing, and wherein the long axes of the elongate ribs of the first set of microstructured partitions are aligned at about 90 degrees relative to the transverse axis of the backing.

Embodiment 17

The tape of any of embodiments 14-16 wherein the microstructured paint-retention pattern is provided on the first major side of the backing.

Embodiment 18

The tape of any of embodiments 14-16 wherein the microstructured paint-retention pattern is provided on the second major side of the backing.

Embodiment 19

The tape of any of embodiments 1-11, 13-16, and 18 wherein the pressure-sensitive adhesive is provided on the first major side of the backing.

Embodiment 20

The tape of any of embodiments 1-12 and 14-17 wherein the pressure-sensitive adhesive is provided on the second major side of the backing.

Embodiment 21

The tape of any of embodiments 1 and 10-20 wherein the primary lines of weakness each comprise a long axis that is oriented within plus or minus two degrees of the transverse axis of the backing and wherein the first secondary lines of weakness each comprise a long axis that is oriented at an included angle of about 90 degrees relative to the long axis of the primary lines of weakness.

Embodiment 22

The tape of embodiment 21 wherein the first secondary lines of weakness are the only secondary lines of weakness of the backing and collectively provide a first secondary microstructured hand-tear pattern of the backing, and wherein the backing does not comprise a second secondary microstructured hand-tear pattern.

Embodiment 23

A method of painting a first surface portion while masking a second surface portion so that it is not painted, the method comprising adhesively attaching a length of the tape of any of embodiments 1-22 to the second surface portion and then applying liquid paint to at least the first surface portion.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather extends at least to the structures described by the language of the claims, and the equivalents of those structures. To the extent that there is a conflict or discrepancy between this specification as written and the disclosure in any document incorporated by reference herein, this specification as written will control.

What is claimed is:

1. A hand-tearable masking tape, comprising:
   a plastic backing comprising a thickness and a longitudinal length and a longitudinal axis and a transverse width and transverse axis, and comprising a first major side and an oppositely-facing second major side;
   wherein the first major side of the backing comprises a primary microstructured hand-tear pattern comprising a multiplicity of primary lines of weakness at least some of which are continuous primary lines of weakness each comprising a continuous groove that does not penetrate through the entire thickness of the plastic backing and that extends across the entire transverse width of the first side of the backing and that comprises a long axis that is oriented within plus or minus 10 degrees of the transverse axis of the backing,
   and wherein the first major side of the backing comprises a first secondary microstructured hand-tear pattern and a second secondary microstructured hand-tear pattern, wherein the first secondary microstructured hand-tear pattern comprising a multiplicity of first secondary lines of weakness comprising dead-end cavities that do not penetrate through the entire thickness of the plastic backing, at least some of which comprise a long axis that is oriented at an angle of about 25 degrees to about 90 degrees relative to the long axis of the primary lines of weakness, wherein the second secondary microstructured hand-tear pattern comprising a multiplicity of second secondary lines of weakness comprising dead-end cavities that do not penetrate through the entire thickness of the plastic backing, at least some of which comprise a long axis that is oriented at an angle of about 25 to about 65 degrees relative to the long axis of the primary lines of weakness and oriented at an angle of about 50 degrees to about 90 degrees relative to the long axis of the first secondary lines of weakness and,
   a pressure-sensitive adhesive disposed on the second major side of the backing.

2. The tape of claim 1 wherein the primary lines of weakness are oriented within plus or minus five degrees of the transverse axis of the backing, wherein the first secondary lines of weakness are oriented at an angle of about 40 to about 50 degrees relative to the long axis of the primary lines of weakness, and wherein the second secondary lines of weakness are oriented at an angle of about 40 to about 50 degrees relative to the long axis of the primary lines of weakness and at an angle of about 80 to about 90 degrees relative to the long axis of the first secondary lines of weakness.

3. The tape of claim 1 wherein the primary lines of weakness are oriented within plus or minus two degrees of the transverse axis of the backing, wherein the first secondary lines of weakness are oriented at an angle of about 45 degrees relative to the long axis of the primary lines of weakness, and wherein the second secondary lines of weakness are oriented at an angle of about 45 degrees relative to the long axis of the primary lines of weakness and at an angle of about 90 degrees relative to the long axis of the first secondary lines of weakness.

4. The tape of claim 1 wherein at least some of the first and second secondary lines of weakness are discontinuous secondary lines of weakness each comprising a multiplicity of recesses spaced along the long axis.

5. The tape of claim 4 wherein the discontinuous lines of weakness each comprise a discontinuity at a location at which the discontinuous line of weakness intersects with a continuous primary line of weakness.

6. The tape of claim 4 wherein at least some of the recesses of the multiplicity of recesses that provide the discontinuous secondary lines of weakness, comprise a depth that is less than about 70% of the depth of the continuous primary lines of weakness.

7. The tape of claim 1 further comprising a low adhesion backsize disposed on the first major side of the backing.

8. The tape of claim 7 wherein the low adhesion backsize comprises a silicone material comprising the reaction product, of one or more (meth)acrylic monomers and/or oligomers and/or vinyl monomers and/or oligomers, with silicone macromer chosen from the following:
   a vinyl-functional silicone macromer having the general formula of Formula I:

Formula I

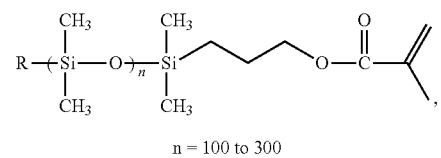

n = 100 to 300 and R is H or an alkyl group;
or, a mercapto-functional silicone macromer having the general formula of Formula IIa, IIb, or IIc:

Formula IIa

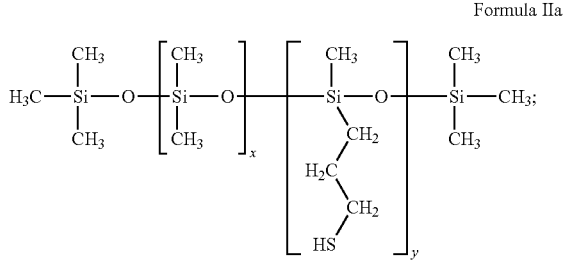

x = 20-1000 and y = 1-10

Formula IIb

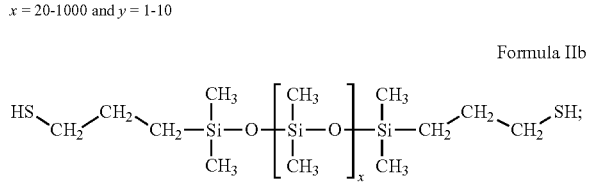

-continued x = 20-1000

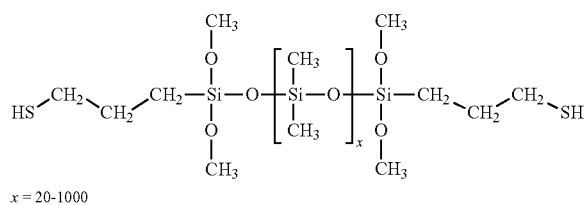

Formula IIc x = 20-1000 or, combinations or mixtures or any of the above silicone macromers.

9. The tape of claim 1 further comprising a microstructured paint-retention pattern that is provided on either the first or the second major side of the backing.

10. The tape of claim 9 wherein the microstructured paint-retention pattern is collectively provided by a first set of microstructured partitions in the form of first non-intersecting elongate ribs, and a second set of microstructured partitions in the form of second non-intersecting elongate ribs, and wherein the elongate ribs of the first set of microstructured partitions comprise long axes that are generally orthogonal to the long axes of the elongate ribs of the second set of microstructured partitions.

11. The tape of claim 10 wherein the long axes of the elongate ribs of the second set of microstructured partitions are aligned within plus or minus about 5 degrees of the long axes of the primary lines of weakness and are aligned within plus or minus about 5 degrees of the transverse axis of the backing, and wherein the long axes of the elongate ribs of the first set of microstructured partitions are aligned at about 90 degrees relative to the transverse axis of the backing.

12. The tape of claim 9 wherein the microstructured paint-retention pattern is provided on the first major side of the backing.

13. The tape of claim 9 wherein the microstructured paint-retention pattern is provided on the second major side of the backing.

14. The tape of claim 1 wherein the primary lines of weakness each comprise a long axis that is oriented within plus or minus two degrees of the transverse axis of the backing and wherein the first secondary lines of weakness each comprise a long axis that is oriented at an angle of about 90 degrees relative to the long axis of the primary lines of weakness.

15. A method of painting a first surface portion while masking a second surface portion so that it is not painted, the method comprising:
adhesively attaching a length of the tape of claim 1 to the second surface portion and then applying liquid paint to at least the first surface portion.

* * * * *

UNITED STATES PATENT AND TRADEMARK OFFICE
CERTIFICATE OF CORRECTION

| | | |
|---|---|---|
| PATENT NO. | : 9,550,921 B2 | Page 1 of 2 |
| APPLICATION NO. | : 13/584451 | |
| DATED | : January 24, 2017 | |
| INVENTOR(S) | : Graham Clarke | |

It is certified that error appears in the above-identified patent and that said Letters Patent is hereby corrected as shown below:

On the Title Page

Column 2 (Other Publications)
Line 6, delete "retrived" and insert -- retrieved --, therefor.

In the Specification

Column 3
Line 47, delete "3210," and insert -- 310, --, therefor.

Column 7
Line 20, delete "and or" and insert -- and/or --, therefor.

Column 8
Line 10, delete "13" and insert -- β --, therefor.

Column 9
Line 51, delete "polymethylpentanes." and insert -- polymethylpentenes. --, therefor.

Column 10
Line 36-37, delete "(meth(acrylic)," and insert -- (meth)acrylic, --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,550,921 B2

Column 12
Line 37-44 (approx.), After

" 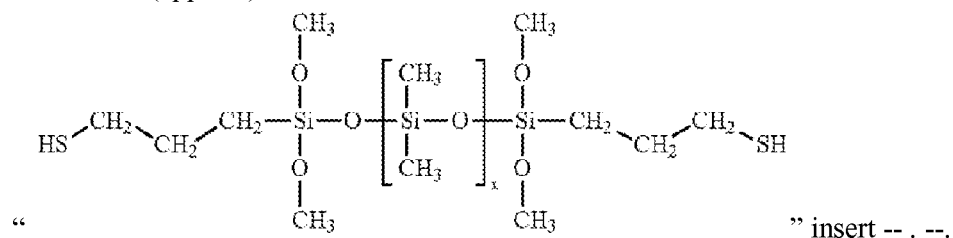 " insert -- . --.